US009674048B2

(12) United States Patent
Cherian et al.

(10) Patent No.: US 9,674,048 B2
(45) Date of Patent: Jun. 6, 2017

(54) EFFICIENT INFRASTRUCTURE SERVICE DISCOVERY WITH SECURITY

(71) Applicant: QUALCOMM Incorporated, San Diego, CA (US)

(72) Inventors: George Cherian, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 14/160,310

(22) Filed: Jan. 21, 2014

(65) Prior Publication Data

US 2014/0359148 A1 Dec. 4, 2014

Related U.S. Application Data

(60) Provisional application No. 61/830,408, filed on Jun. 3, 2013.

(51) Int. Cl.
*G06F 15/16* (2006.01)
*H04L 12/24* (2006.01)
*H04L 29/08* (2006.01)
*H04W 8/00* (2009.01)
*H04W 12/06* (2009.01)

(52) U.S. Cl.
CPC .............. *H04L 41/28* (2013.01); *H04L 67/16* (2013.01); *H04W 8/005* (2013.01); *H04L 67/2838* (2013.01); *H04W 12/06* (2013.01)

(58) Field of Classification Search
CPC ......... H04L 41/28; H04L 67/16; H04L 43/04; G06F 1/31; G06F 15/16

USPC .......................... 709/203, 206, 229; 370/330
See application file for complete search history.

(56) References Cited

U.S. PATENT DOCUMENTS

| 5,655,015 A * | 8/1997 | Walsh ................... H04M 1/247 379/142.06 |
| 8,996,620 B2 * | 3/2015 | Lu ......................... G06Q 10/107 370/352 |
| 2003/0035851 A1 | 2/2003 | Chen |
| 2004/0199616 A1 | 10/2004 | Karhu |
| 2005/0078644 A1 | 4/2005 | Tsai et al. |

(Continued)

OTHER PUBLICATIONS

International Search Report and Written Opinion—PCT/US2014/038712—ISA/EPO—Sep. 16, 2014.

(Continued)

*Primary Examiner* — Tesfay Yohannes
(74) *Attorney, Agent, or Firm* — Knobbe, Martens, Olson & Bear

(57) ABSTRACT

Systems, methods, and apparatuses for efficient infrastructure service discovery with security are disclosed. In one aspect, systems and methods for advertising services available via an access point without requiring a device to connect for discovery are described. This may allow devices to determine, prior to establishing a connection with an access point, whether a desired service is offered. Further description of publication rules is provided. Service providers can use the publication rules to identify service information which may be discovered by devices based on device authentication status or other factors to allow controlled, secure discovery of the service information.

24 Claims, 10 Drawing Sheets

(56) References Cited

U.S. PATENT DOCUMENTS

| | | | |
|---|---|---|---|
| 2005/0138173 A1* | 6/2005 | Ha | H04L 29/12113 709/203 |
| 2007/0141988 A1 | 6/2007 | Kuehnel et al. | |
| 2007/0178908 A1* | 8/2007 | Doyle | G08G 1/127 455/456.1 |
| 2007/0198501 A1* | 8/2007 | Sundaranatha | G06F 17/30448 |
| 2008/0262848 A1* | 10/2008 | Shienbrood | H04M 3/4936 704/275 |
| 2009/0031035 A1* | 1/2009 | Dharmaraju | H04W 8/005 709/230 |
| 2009/0240794 A1 | 9/2009 | Liu et al. | |
| 2010/0322213 A1 | 12/2010 | Liu et al. | |
| 2011/0151840 A1* | 6/2011 | Gong | G06Q 30/0267 455/414.1 |
| 2012/0246468 A1 | 9/2012 | Gabor | |
| 2013/0097289 A1 | 4/2013 | Alsterlid et al. | |
| 2013/0170470 A1* | 7/2013 | Kneckt | H04W 72/0446 370/330 |
| 2013/0195026 A1* | 8/2013 | Johnsson | H04W 72/0493 370/329 |
| 2014/0045422 A1* | 2/2014 | Qi | H04W 76/023 455/39 |
| 2014/0313936 A1* | 10/2014 | You | H04L 67/16 370/254 |

OTHER PUBLICATIONS

Lee Y.W., et al., "Network Selection and Discovery of Service Information in Public WLAN Hotspots," WMASH '04 Proceedings of the 2nd ACM international workshop on Wireless mobile applications and services on WLAN hotspots, 2004, pp. 81-92.

\* cited by examiner

EFFICIENT INFRASTRUCTURE SERVICE DISCOVERY WITH SECURITY

CROSS-REFERENCE TO RELATED APPLICATIONS

This application claims priority from U.S. Provisional Patent Application No. 61/830,408, entitled "EFFICIENT INFRASTRUCTURE SERVICE DISCOVERY WITH SECURITY," filed Jun. 3, 2013, which is incorporated by reference in its entirety. Any and all priority claims identified in the Application Data Sheet, or any correction thereto, are hereby incorporated by reference under 37 C.F.R. §1.57.

BACKGROUND

Field

The present application relates generally to wireless communications, and more specifically to systems, methods, and devices for secure and efficient discovery of infrastructure services on a network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. In general, some devices may serve as access points (APs) for a network, which other devices may connect to access functions of the network. Different APs may offer varying services to devices connected to those APs. Examples of services include music service, video service, print service, photo service, information service, and storage service. Thus, improved systems, methods, and devices for providing an efficient process for devices to discover a service which may be accessed through the AP are desired.

SUMMARY

The systems, methods, and apparatuses of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved paging for devices in a wireless network.

In one innovative aspect, an apparatus for providing service information is provided. The apparatus includes a receiver configured to receive a service information query from a user equipment for a service. The apparatus further includes a service information processor. The service information processor is configured to transmit a service discovery request for the service. The service information processor is further configured to receive a service discovery response from the service including a publication rule identifying an authentication status of a requesting user equipment and service information to transmit to a requesting user equipment having the authentication status. The service information processor is further configured to generate the service information based at least in part on the service discovery response and an authentication status of the user equipment. The apparatus further includes a transmitter configured to transmit a service information response including the service information.

An innovative method of providing service information is also provided. The method includes receiving a service information query from a user equipment for a service. The method further includes transmitting a service discovery request for the service. The method also includes receiving a service discovery response from the service including a publication rule identifying an authentication status of a requesting user equipment and service information to transmit to a requesting user equipment having the authentication status. The method also includes generating the service information based at least in part on the service discovery response and an authentication status of the user equipment. The method also includes transmitting a service information response including the service information.

Another innovative apparatus for providing service information is provided. The apparatus includes means for receiving a service information query from a user equipment for a service. The apparatus also includes means for transmitting a service discovery request for the service. The apparatus also includes means for receiving a service discovery response from the service including a publication rule identifying an authentication status of a requesting user equipment and service information to transmit to a requesting user equipment having the authentication status. The apparatus includes means for generating the service information based at least in part on the service discovery response and an authentication status of the user equipment. The apparatus includes means for transmitting a service information response including the service information.

In a further innovative aspect, a computer-readable storage including instructions executable by a processor of an apparatus is provided. The instructions cause the apparatus to receive a service information query from a user equipment for a service. The instructions also cause the apparatus to transmit a service request to the service. The instructions cause the apparatus to receive a service response from the service including a publication rule identifying an authentication status of a requesting user equipment and service information to transmit to a requesting user equipment having the authentication status. The instructions also cause the apparatus to generate the service information based at least in part on the service discovery response and an authentication status of the user equipment. The instructions cause the apparatus to transmit a service information response including the service information.

In another innovative aspect, an apparatus for providing access to a networked service is provided. The apparatus includes a receiver configured to receive a service discovery request for the networked service. The apparatus includes a service information processor configured to generate service information describing the networked service, the service information including a publication rule identifying an authentication status of a requesting user equipment and service information to transmit to a requesting user equipment having the authentication status. The apparatus also includes a transmitter configured to transmit a service discovery response including the service information.

A method of providing access to a networked service is provided in a further innovative aspect. The method includes receiving a service discovery request for the networked service. The method includes generating service information describing the networked service, the service information including a publication rule identifying an authentication status of a requesting user equipment and service information to transmit to a requesting user equipment having the authentication status. The method includes transmitting a service discovery response including the service information.

Another apparatus for providing access to a networked service is provided in a further innovative aspect. The apparatus includes means for receiving a service discovery request for the networked service. The apparatus includes means for generating service information describing the networked service, the service information including a publication rule identifying an authentication status of a requesting user equipment and service information to transmit to a requesting user equipment having the authentication status. The apparatus also includes means for transmitting a service discovery response including the service information.

A further computer-readable storage including instructions executable by a processor of an apparatus is provided in another innovative aspect. The instructions cause the apparatus to receive a service discovery request for a networked service. The instructions further cause the apparatus to generate service information describing the networked service, the service information including a publication rule identifying an authentication status of a requesting user equipment and service information to transmit to a requesting user equipment having the authentication status. The instructions further cause the apparatus to transmit a service discovery response including the service information.

BRIEF DESCRIPTION OF THE DRAWINGS

The foregoing and additional aspects described herein will become more readily apparent by reference to the following Description when taken in conjunction with the accompanying drawings

DETAILED DESCRIPTION

Figure 1A:
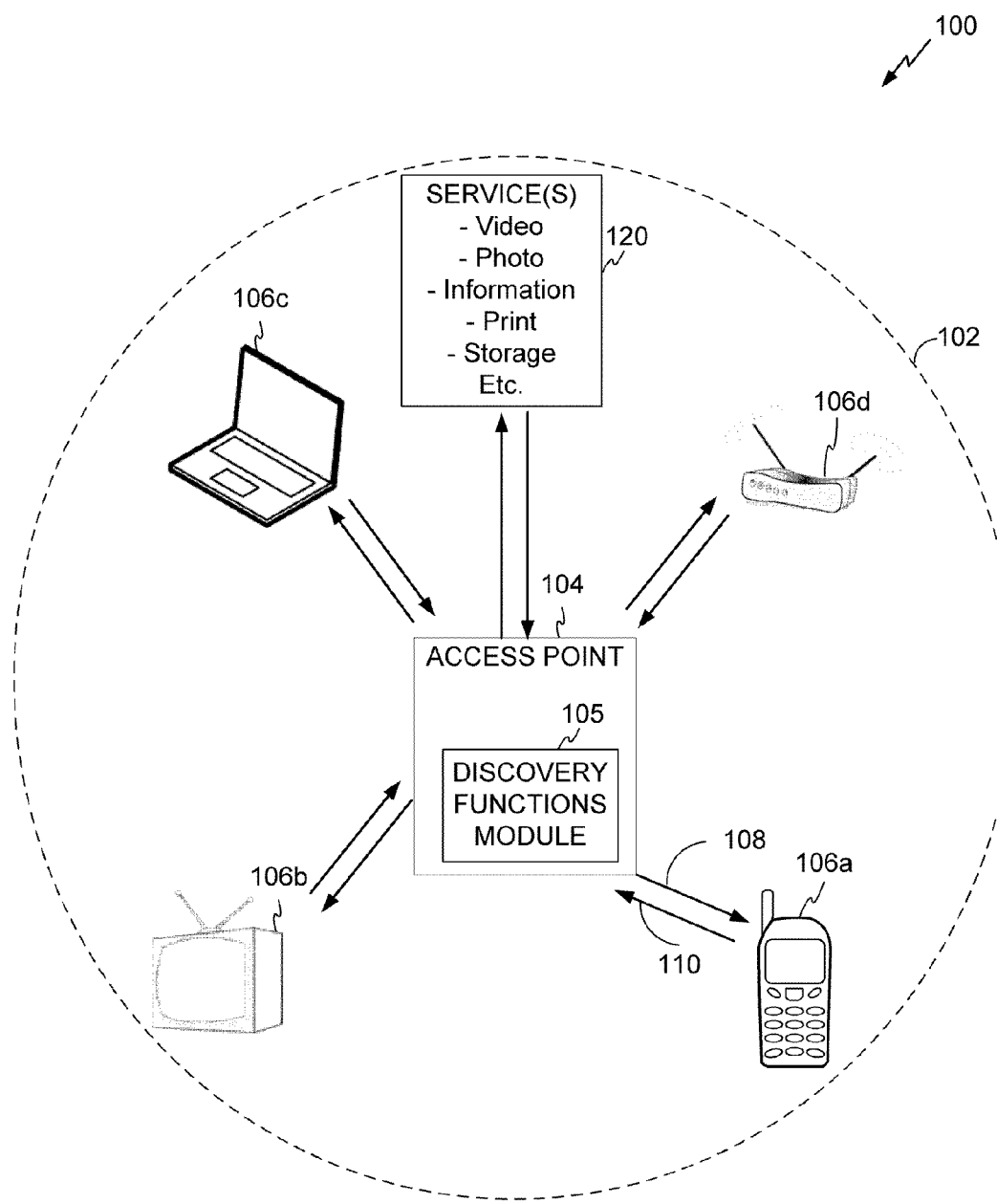
FIG. 1A shows an example wireless communication system in which aspects of the present disclosure may be employed.

As discussed above, one way to identify a service provided via an AP is to connect to the AP and then submit a query for services available through the AP. The connection process may include authentication processing. From the device perspective, the process of connecting, authenticating, and discovering may include the utilization of processing resources, power resources, transmit and/or receive resources, and time. Each of these may impact the performance of the device. Similar resources may be expended from the AP perspective to support the connection, authentication, and discovery. As the AP may be servicing multiple devices, the impact on the AP may be felt by one or more of the devices connected thereto.

Should the AP provide the service of interest to the device, the overhead may present little loss of efficiency. However, if the device does not discover the service at a given AP, the connection and discovery process may terminate and be repeated again with another AP. In these cases, the potential for efficiency gains exist.

In some configurations, the AP may provide access to services for multiple service providers. For example, an airport access point may provide wireless access to the networks operated by different wireless carriers. In such configurations, a device may not only be looking for a particular service, but a particular service on a particular provider network. Further details of how a device can discover and a single AP can efficiently provide discoverable service for a provider is described.

One non-limiting advantage of the features described below is to allow APs the ability to advertise services available via the AP without requiring a device to connect for discovery. This may allow devices to determine prior to establishing a connection with an AP, whether a desired service is offered. If the service is not offered, the device may avoid the overhead to set up a connection and thus improve the efficiency of the device and AP.

Another non-limiting advantage of the features described below is to allow services hosted by an AP to determine whether or not the service is discoverable to unconnected devices. In some implementations, a service may wish to advertise some or no information about itself to unconnected devices. In this way, service providers may secure their services.

A further non-limiting advantage of the features described is to allow a single access point the ability to provide secure, efficient, and discoverable access to services across multiple service provider networks.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an 802.11 protocol. In some implementations, a WLAN includes various devices which are the components that access the wireless network. For example, there may be two types of devices: access points (APs) and clients (also referred to as stations, or STAs). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi compliant wireless link to obtain general connectivity to the Internet or to other wide area networks. In some implementations an STA may also be used as an AP.

An access point (AP) may also comprise, be implemented as, or known as a base station, wireless access point, access node or similar terminology.

A station "STA" may also comprise, be implemented as, or known as an access terminal (AT), a subscriber station, a subscriber unit, a mobile station, a remote station, a remote terminal, a user terminal, a user agent, a user device, user equipment, or some other terminology. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured for network communication via a wireless medium.

As discussed above, certain of the devices described herein may implement an 802.11 standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1A shows an example wireless communication system 100 in which aspects of the present disclosure may be employed. The wireless communication system 100 may operate pursuant to a wireless standard, for example an 802.11 standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit messages via a communication link such as the downlink 108, to other nodes STAs 106 of the system 100. Such messages may be transmitted periodically. A message may be transmitted to a single device (e.g., unicast), transmitted to a group of devices (e.g., multicast), or transmitted to all devices (e.g., broadcast). Accordingly, a message may include information both common (e.g., shared) amongst several devices, and information specific to a given device.

In some aspects, a STA 106 may be required to associate with the AP 104 in order to send communications to and/or receive communications from the AP 104. In one aspect, information for associating with the AP 104 is included in a message by the AP 104. After receiving the information for associating, the STA 106 may transmit a message, such as an association probe or request, to the AP 104.

An access point 104 may also provide access to one or more service 120. As just a few examples, the services 120 may include music service, video service, print service, photo service, information service, and storage service. The services 120 may be discovered by STA 106. In the implementation shown, the AP 104 includes a discovery functions module 105. The discovery functions module 105 is configured to facilitate the discovery of the services 120 associated with the AP 104 as described in further detail below. In some implementations, one or more of the services 120 may be provided by a STA within the basic service area 102 for the AP 104. For example, a printer attached to a home network may provide print services.

Figure 1B:
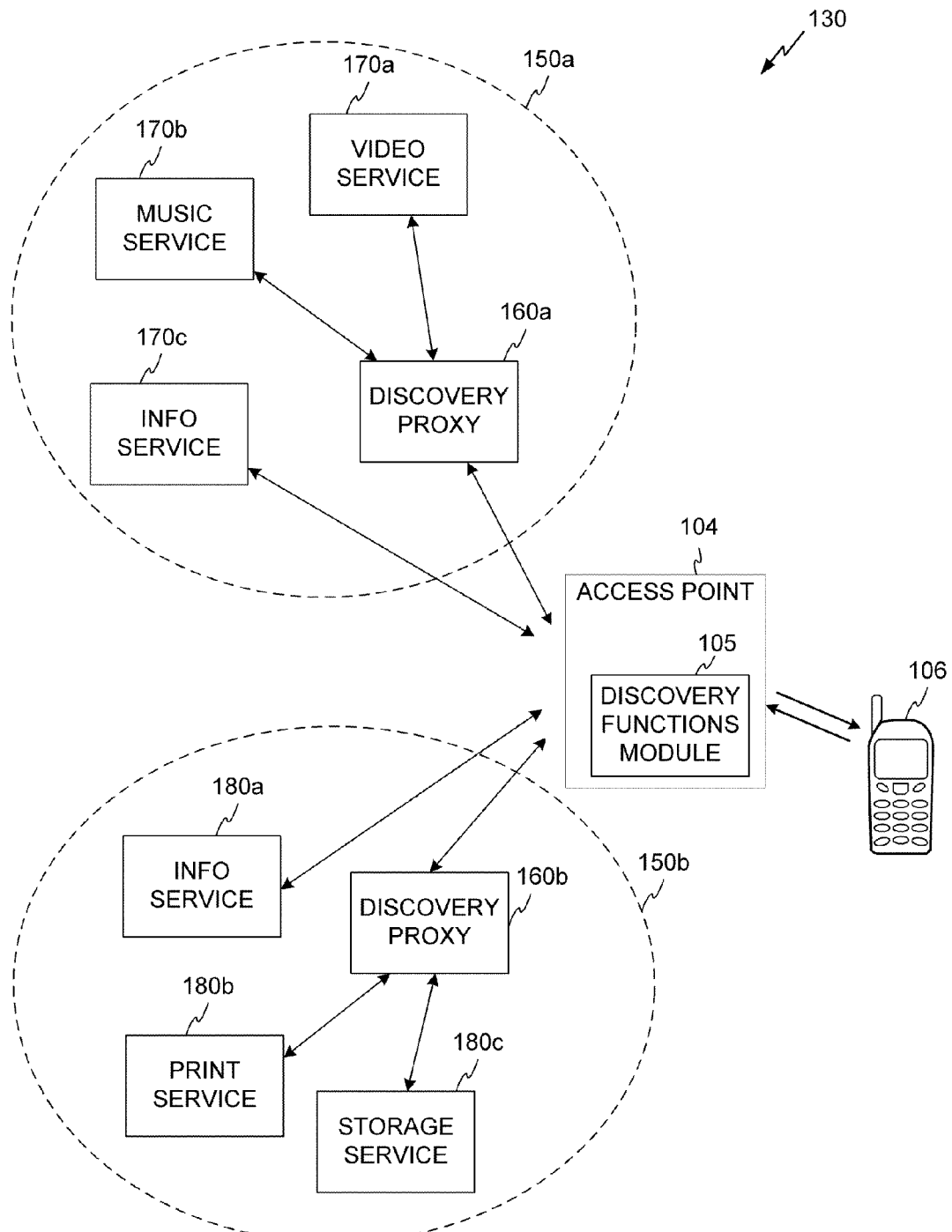
FIG. 1B shows another example wireless communication system in which aspects of the present disclosure may be employed.

FIG. 1B shows another example wireless communication system in which aspects of the present disclosure may be employed. The wireless communication system 130 includes the AP 104 and STA 106 which are similar to those described in FIG. 1A. FIG. 1B also illustrates two sub-networks, network 150*a* and network 150*b*. The sub-networks, network 150*a* and/or network 150*b*, may be accessed by the STA 106 via the AP 104. In some implementations, the sub-networks may be implemented as virtual local area networks, virtual private networks, home networks, private network, or the like.

As shown in FIG. 1B, the network 150*a* includes a discovery proxy 160*a* and three services, a video service 170*a*, a music service 170*b*, and an information ("info") service 170*c*. It will be understood that the network 150*a* may include more or less services depending on the configuration of the network 150*a*. The network 150*b* also includes a discovery proxy 160*b*, an info service 180*a* (e.g., traffic, weather, movie times, sports scores, etc.), a print service 180*b*, and a storage service 180*c* which are similar to those included in the network 150*a*. The types of services shown in FIG. 1B are examples and other services may be included without departing from the scope of the present disclosure.

The discovery proxy 160*a* provides an intermediate level of control between for discovering and providing service access and information. The discovery proxy 160*a* may identify which if any information to provide about services connected thereto. For example, the service 180*b* may register with the discovery proxy 160*a*. As part of the registration process, the service 180*b* may provide information for discovery by authenticated STAs and information which may be discovered by unauthenticated STAs. In some implementations, the discovery proxy 160*a* may inquire with the associated services for discovery preferences. The received information may be stored (e.g., cached) and periodically updated.

As one example, the information may identify a type for the service (e.g., service 180*b*). One type may be referred to as a "private" service. Private services may be services which are advertised only to devices which have been associated with the AP 104. The service information is made available only to devices connection to the network. The disclosed features also contemplate a second service type which may be referred to as a "public" service. Public service information is made available to non-associated device in addition to associated devices. Accordingly, the service may be discovered either by devices connected to the network or devices which may connect to the network. Further service types to govern the accessibility of service information may be defined based on device class, application, device type, device operating system, device capability, device features (e.g., GPS, Bluetooth, USB connectivity, camera, display), and the like.

As shown in FIG. 1B, the service 170*c* may be accessible directly through the AP 104. Service 170*a* and service 170*b* may be accessed via the discovery proxy 160*a*. Similarly, service 180*b* and service 180*c* may be accessed via the discovery proxy 160*b* while service 180*a* is accessible directly through the AP 104.

The AP 104 in FIG. 1B includes a discovery functions module 105. The discovery functions module 105 may be configured to perform one or more of the discovery functions described herein. For example, the discovery functions module 105 may be configured to communicate discovery requests received from the UE 106 to the discovery proxy 160 and/or the various services. The discovery functions module 105 may be further configured to enforce the publication rules for service information received from the various services.

While the discovery proxy 160*a* and the discovery proxy 160*b* are shown as separate functional entities in FIG. 1B, it will be understood that the functionality of the discovery proxy 160*a* and the discovery proxy 160*b* may be incorporated into the AP 104 and/or each service. For ease of explanations, the discovery proxy 160*a* and the discovery proxy 160*b* may be collectively referred to as discovery proxy 160.

Figure 2:
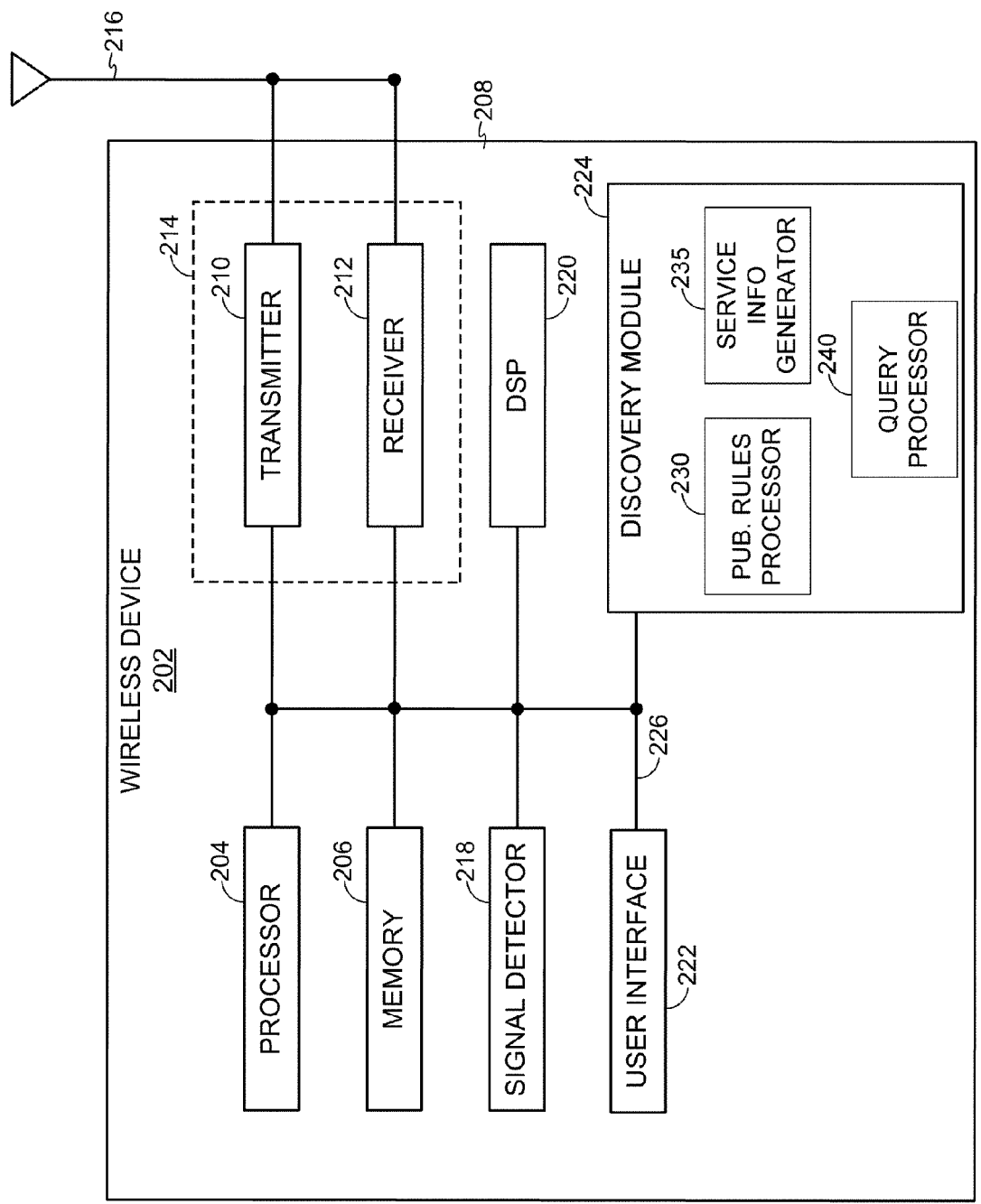
FIG. 2 shows a functional block diagram of an example wireless device that may be employed within a wireless communication system.

FIG. 2 shows an example functional block diagram of a wireless device 202 that may be employed within a wireless communication system. The wireless device 202 may be deployed in the wireless communication system 100 of FIG. 1A and/or the wireless communication system 130 of FIG. 1B. The wireless device 202 is an example of a device that may be configured to implement the various methods described herein. For example, the wireless device 202 may comprise the AP 104, the discovery proxy 160, or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit messages. The transmitter 210 may be configured to transmit service discovery requests and/or responses. The transmitter may also be configured to transmit "paging messages" that are configured to indicate service discovery information. For example, the transmitter 210 may be configured to transmit paging messages.

The receiver 212 may be configured to wirelessly receive messages such as service discovery messages. In some implementations, the receiver may be configured to receive paging messages.

The transmitter 210 and receiver 212 may send and receive, respectively, messages generated by the processor 204, discussed above. When the wireless device 202 is implemented or used as a STA 106, the processor 204 may be configured to process received messages. When the wireless device 202 is implemented or used as an AP 104, the processor 204 may also be configured to process and/or generate discovery messages. When the wireless device 202 is implemented or used as discovery proxy 160, the processor 204 may also be configured to processor and/or generate discovery messages.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The wireless device 202 shown also includes a discovery module 224. The discovery module 224 may include one or more of a publication rules processor 230, a service information generator 235, and a query processor 240. When the wireless device 202 is implemented as a UE 106, the query processor 240 may be configured to generate service discovery requests. Example service discovery requests include zeroconf type messages, universal plug and play messages, and access network query protocol service-query messages. The service discovery requests may be provided to the transmitter 210 for transmission. The query processor 240 may also receive service discovery responses via the receiver 212. The query processor 240 may be further configured to parse the service discovery responses. The information received and parsed may be stored in the memory 206 for further processing such as attachment processing if the AP 104 is associated with the desired service.

When the wireless device 202 is implemented as an AP 104, the query processor 240 may be configured to send and receive discovery requests with UEs and with service providers. In some implementations, the query processor 240 of the AP 104 may communicate directly with services of the service providers (e.g., info service 108a of FIG. 1B). In some implementations, the query processor 240 may communicate with a discovery proxy for the service (e.g., discovery proxy 160a of FIG. 1B).

The query processor 240 may be configured to include additional information in service discovery requests transmitted to the service. For example, the query processor 240 may be configured to include information regarding the UE's connection status (e.g., connected versus non-connected) as part of the service discovery query. The query processor 240 may also be configured to route queries based on information included in the service discovery request. For example, a UE 106 may include a preferred service provider in addition to a service of interest. In such instances, the query processor 240 of the AP 104 may be configured to route the service discovery request for the service provider specified in the request rather than transmitting the request to all associated networks.

When the wireless device 202 is implemented as an AP 104, the publication rules processor 230 may be included. The publication rules processor 230 may be configured to receive and apply publication rules for the services. For example, the AP 104 may receive service information which is for publication only to authenticated devices. The publication rules processor 230 may be configured to obtain the authentication status for a UE 106 associated with a given service discovery query, and provide the service discovery information based on the authentication status and the publication rule for the service. It will be appreciated that the authentication status may include authenticated or non-authenticated for the device via the network. IN some implementations, the authentication status may be group based (e.g., the device has been authenticated as a member of a particular group or at a specific service level). Notwithstanding the granularity of the authentication status, the status values implemented with a system may be used to determine what, if any, service information to publish.

The service information generator 235 may be included to create the service information response for transmission via the transmitter 210 to the UE 106. In some implementations, the publication rule may identify a subset of service information which is discoverable by non-authenticated devices. In such implementations, the service information generator 235 may create a service information message including the publicly available information for a non-authenticated device. This message may then be transmitted to the non-authenticated device via the transmitter 210.

When the wireless device 202 is implemented at the service provider (e.g., included in a service or as a provider service proxy), the query processor 240 may be configured similarly as when the wireless device 202 is implemented as an AP. The query processor 240 may be configured to receive and send service discovery messages as described herein. The query processor 240 may determine what information to include for a given query based on information received from the publication rules processor 230. For example, the service discovery request may include capability information for the requesting UE 106. Based on this information, the publication rules processor 230 may identify elements of the service information which may be published for a UE 106 with the indicated capability information. The service information generator 235 may be similarly configured as when the wireless device 202 is an AP 104. The service information generator 235 may be configured to create the service discovery response and provide this for transmission such as via transmitter 210.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

An AP 104 may offer a wide variety of services to a STA 106. For example, the AP 104 may offer specialized services, such as: printing; streaming and/or download of content such as music, games, or videos; storage; photo processing; or other types of services. These services may be offered on an ad hoc basis. The services may vary with time. In any given network, different APs may offer difference services to STAs connected to those APs. An AP 104 may also be able to run applications which may start or stop the offering of certain services to a STA 106. Furthermore, the AP 104 may provide services from one or more provider networks. Because different APs may offer different services, and from potentially disparate providers, it may be beneficial for an AP to be configured to advertise which services are available on via AP. Similarly, it may be desirable to allow a STA 106 to discover services without establishing a connection with the AP 104.

Figure 3A:
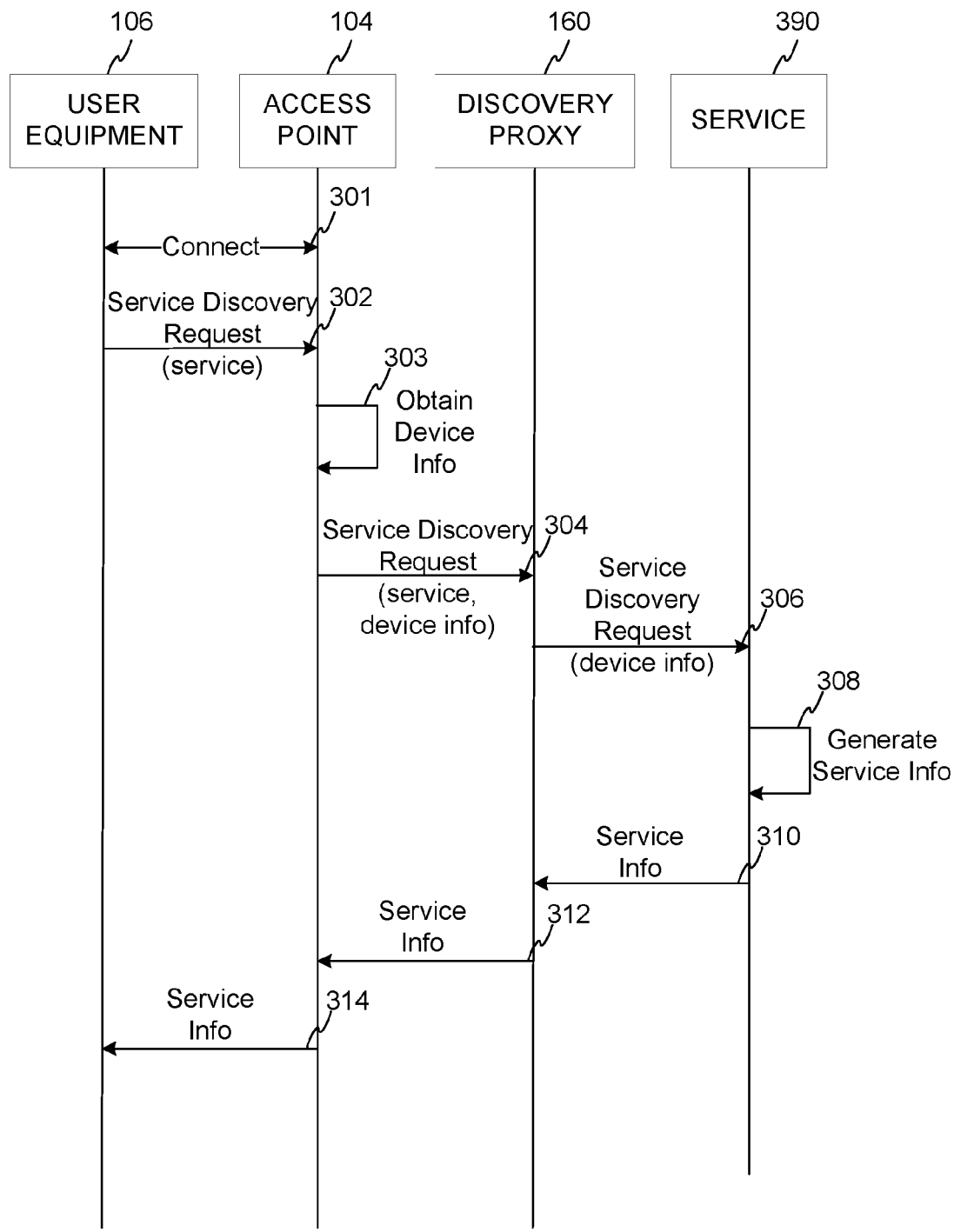
FIG. 3A illustrates a message flow diagram illustrating an example flow for efficient infrastructure service discovery with security.

FIG. 3A illustrates a message flow diagram illustrating an example flow for efficient infrastructure service discovery with security. The message flow of FIG. 3A shows messages exchanged between several entities which may be included in a wireless communication system. For ease of explanation, the number of entities shown has been limited. However, it will be understood that additional entities may be added or multiple entities combined consistent with the description herein. The flow of FIG. 3A illustrates a connected (e.g., authenticated) UE flow.

The flow of FIG. 3A shows the user equipment 106, the access point 104, the discovery proxy 160, and a service 390. Messages 301 may be transmitted between the user equipment 106 and the access point to connect with a network provided by the access point 104.

A service discovery request 302 is transmitted from the user equipment 106 to the access point 104. The user equipment 106 need not be associated with the access point 104. The service discovery request 302 from the user equipment 106 may be a zeroconf type protocol (e.g., multicast domain name service; Bonjour™; etc.), access network query protocol, or a Universal Plug and Play (UPnP) message. The service discovery request 302 may include an identification of a service or service type to be discovered. The service discovery request 302 may, in some implementations, also include an identification of a service provider. The identification of the service provider may include a network access identifier, a roaming consortium identifier, an operator name, or the like. The service discovery request 302 may further include information identifying the user equipment 106. In the flow of FIG. 3A, as the user equipment 106 is connected to the access point 104, an identifier may be assigned by the access point 104 for the user equipment 106. This identifier may be included in the service discovery request 302.

The access point 104 receives the service discovery request 302. Based on the information included in the service discovery request 302 the access point may obtain device information (dev_info) for the UE associated with the service discovery request 302. The information may be obtained from memory, from another network entity (e.g., mobility management entity, core network, etc.), or via additional message(s) exchanged with the user equipment 106.

The access point 104 generates a service discovery request 304. The service discovery request 304 may include one or more of the service requested, service type requested, request characteristics (e.g., date/time of request), and the obtained information about the user equipment 106 that caused the service discovery request 304 to be generated. The information about the user equipment may include an identifier as to whether the user equipment 106 is associated (e.g., connected and/or authenticated) with the access point 104.

As shown in FIG. 3A, the access point 104 may transmit the service discovery request 304 to the discovery proxy 160 associated with the service 390. In some implementations, the access point 104 may transmit the discovery request message directly to the service 390. The discovery proxy 160 may then transmit a service discovery request 306 to the service 390 to obtain service information. The service discovery request 306 may include the device information.

The service 390 may generate the service information 308 based on the received device information. For example, if the message 306 identifies the user equipment 106 as authenticated, the service information 308 may include a full discovery record for the service 390. If the message 306 identifies the user equipment 106 as unauthenticated, the service information 308 may include a partial discovery record for the service 390. In some implementations, an unauthenticated user equipment may cause the generation of no service information. The generation may be further based on the time the discovery request was transmitted, a capability of the user equipment initiating the discovery request, or other information described herein.

Message 310 includes the generated service information and is sent to the discovery proxy 160. In some implementations, the discovery proxy 160 may cache this information for future discovery requests. In such implementations, the message 306 and message 308 may be omitted in favor of the information included in the cache. The cache may include rules which indicate how long service information may be cached for, which types of requests the cache may be used for, and the like.

Message 312 and message 314 carry the service information from the discovery proxy 160 through the access point 104 to the user equipment 106. Accordingly, the user equipment 106 may obtain information about the service 390 without connecting to the access point 104. Furthermore, the service 390 may securely provide the service information by selectively including service information based on the device submitting the request.

Figure 3B:
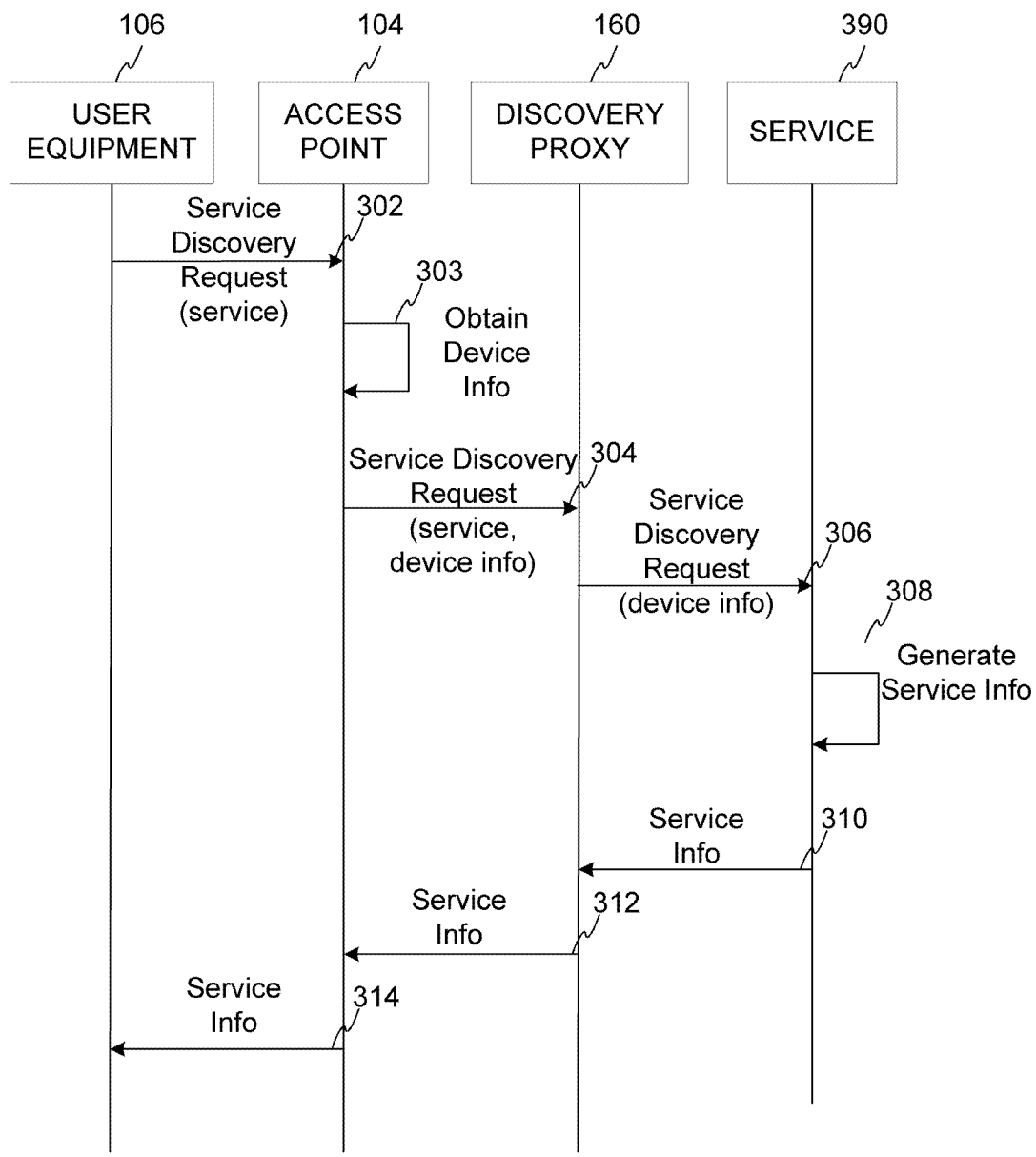
FIG. 3B illustrates a message flow diagram illustrating another example flow for efficient infrastructure service discovery with security.

FIG. 3B illustrates a message flow diagram illustrating another example flow for efficient infrastructure service discovery with security. The message flow of FIG. 3B shows messages exchanged between several entities which may be included in a wireless communication system. For ease of explanation, the number of entities shown has been limited. However, it will be understood that additional entities may be added or multiple entities combined consistent with the description herein.

The flow shown in FIG. 3B illustrates the discovery process for a user equipment which is not connected (e.g., authenticated). The messages are the same as described with reference to FIG. 3A. It will be noted that the flow shown in FIG. 3B omits the connect message(s) 301 which are shown in FIG. 3A.

Figure 3C:
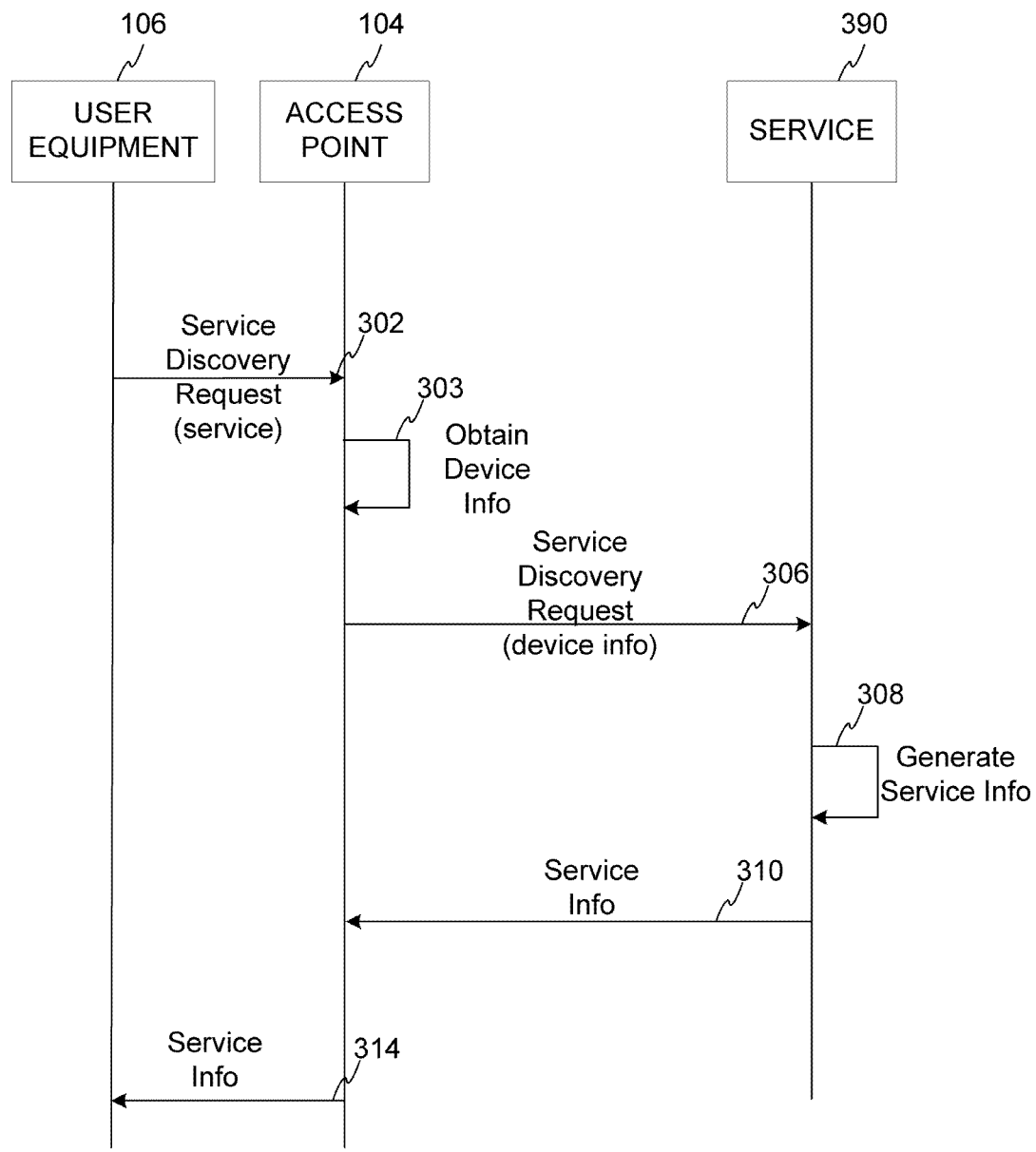
FIG. 3C illustrates a message flow diagram illustrating a further example flow for efficient infrastructure service discovery with security.

FIG. 3C illustrates a message flow diagram illustrating a further example flow for efficient infrastructure service discovery with security. The message flow of FIG. 3C shows messages exchanged between several entities which may be included in a wireless communication system. For ease of explanation, the number of entities shown has been limited. However, it will be understood that additional entities may be added or multiple entities combined consistent with the description herein.

The messages in FIG. 3C are the same as described with reference to FIG. 3B. However, as shown in FIG. 3C, the access point 104 communicates directly with the service 390 rather than via the discovery proxy 160 shown in FIGS. 3A and 3B.

Figure 4:
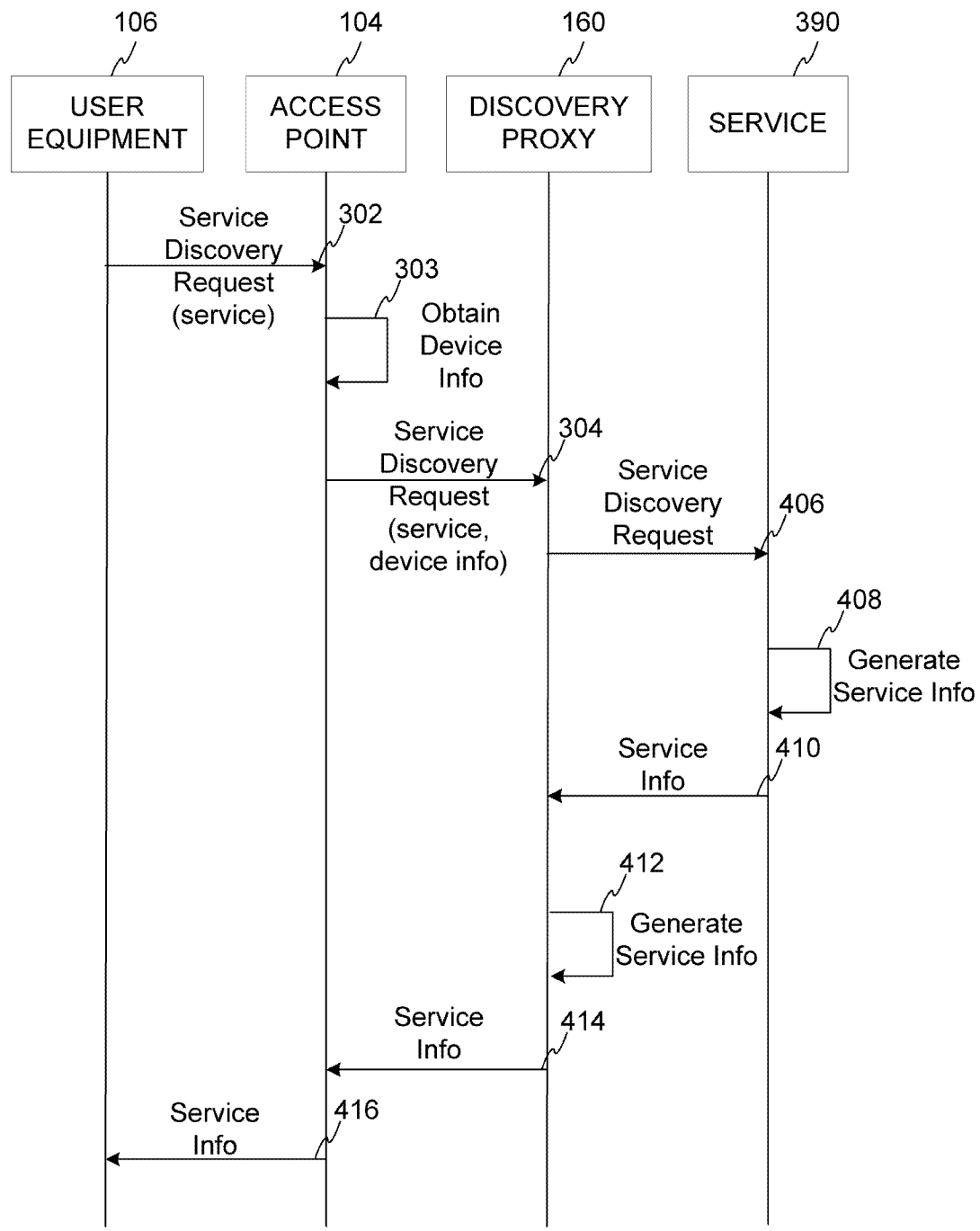
FIG. 4 shows a message flow diagram illustrating another example flow for efficient infrastructure service discovery with security.

FIG. 4 shows a message flow diagram illustrating another example flow for efficient infrastructure service discovery with security. The message flow of FIG. 4 shows messages exchanged between several entities which may be included in a wireless communication system. For ease of explanation, the number of entities shown has been limited. However, it will be understood that additional entities may be added or multiple entities combined consistent with the description herein.

The message flow in FIG. 4 illustrates one way to avoid changes to existing services to provide efficient infrastructure service discovery with security. Where in FIGS. 3A-3C the service 390 generated the service information, the message flow in FIG. 4 may be used to allow the service to report service information to the discovery proxy 160. The discovery proxy 160 may then enforce advertisement rules for the service 390. The enforcement may be referred to as filtering the service information. The filtering may be based on whether the service information may be made publicly available or should only be provided to associated UEs. The filtering may also be based on security settings for the UE. For example, in a home network implementation, a particular device may be registered with the home network (e.g., Dad's Laptop) while a guests device may be foreign to the network. In such configurations, the known device may be permitted more information than the guest device.

The flow of FIG. 4 shows the user equipment 106, the access point 104, the discovery proxy 160, and the service 390. The message flow in FIG. 4 begins similarly to the flow in FIG. 3 with service discovery request 302, obtaining of the device information 303, and service discovery request 304. However, the service discovery request 406 may be a standard discovery request (e.g., zeroconf type protocol, access network query protocol, or a Universal Plug and Play (UPnP)). The service 390 may generate the service information 408 as if the requesting device was authenticated and transmit a service information message 410 to the discovery proxy 160.

Message(s) 412 may be used to generate the service information by the discovery proxy 160. The discovery proxy 160 may include advertisement rules in a memory. The discovery proxy 160 may be configured to alter, prune, or prevent information for the service 390 from being transmitted in a service information response message 414. For example, if the service allows no unauthenticated devices from discovering the service, the discovery proxy 160 may transmit an empty response (e.g., "Service not found") in message 414. In some implementations, the discovery proxy 160 may perform this determination in advance of sending the request message 406. In doing so, the discovery proxy 160 may avoid querying for service information which would otherwise not be released to the requesting device. A message 416 may be sent to the user equipment 106 indicating a response the requested discovery.

Some implementations may include messages formatted according to a zeroconf type protocol. In such implementations, a multicast domain name services (MDNS) message may be used for discovering services. Table 1 below shows an example format for an MDNS packet.

TABLE 1

| offset (bytes) | 0 | 1 |
| --- | --- | --- |
| 0 | | ID = 0x0000 |
| 2 | | Flags |
| 4 | | QDCOUNT |
| 6 | | ANCOUNT |
| 8 | | NSCOUNT |
| 10 | | ARCOUNT |
| 12 | | Data |

To allow the indication as to whether the message includes public or private service information, the multicast domain name service message may include an additional attribute. For example, the multicast domain name service message shown in Table 1 includes a Flag field. In the current standard, only the first and sixth bits of this field are used for communication. One bit of the Flag field (e.g., second bit) may be used to indicate the privacy level for the service information included in the message. For instance, a value of 1 may indicate private information (e.g., share only with connected devices) while a value of 0 may indicate public information (e.g., share with connected and unconnected devices). Additional flag bits may be used to provide increased levels of permissions. The use of the Flag field is one example of how to implement aspects described herein for a zeroconf type protocol. In some implementations, the Data field of the multicast domain name service message may include the privacy information.

For universal plug and play implementations, the UPnP response message may include service information as formatted text (e.g., fixed format text; XML; and the like). In some implementations, the information may be requested via HTTP and returned via an HTTP response. An example HTTP response including UPnP response information is shown in Listing 1 below.

LISTING 1

NOTIFY * HTTP/1.1\r\n
Request Method: NOTIFY
Request URI: *
Request Version: HTTP/1.1
HOST: 239.255.255.250:1900\r\n

LISTING 1

```
CACHE-CONTROL: max-age=60\r\n
LOCATION: http://128.100.20.52:5200/Printer.xml
NT: urn:schemas-upnp-org:service:PrintBasic:1\r\n
NTS: ssdp:alive\r\n
SERVER: Network Printer Server UPnP/1.0 OS 1.03.04.02
12-21-2007\r\n
USN: uuid:Dell-Printer-1__0-dsi-foo::urn:schemas-upnp-
org:service:PrintBasic:1\r\n
...
```

In such implementations, a new field may be added to the formatted text to identify the privacy setting for the associated service. For instance, a privacy element may be added to the XML document. As discussed above, the privacy element may be a simple element (e.g., binary flag) or a more complex element identifying classes, sub-classes, and applicability rules for discovery of the service. Applicability rules may include time during which the rule applies, preconditions for applicability (e.g., device characteristics, quality of service, bandwidth, etc.), classes of devices governed by the rule, exclusion rules, and the like.

As a third example, the access network query protocol (ANQP) includes a service-query message type. The service-query message may be transmitted from the UE 106 to the AP 104 to discover a particular service. The service-query message may further include an attribute to identify an operator for the service. For example, a user device is looking for print services provided by their wireless carrier. In an airport setting, the AP 104 may be operated by a third-party, but connected with the wireless carrier. The user device may transmit the service-query message including the operator identifier to locate the appropriate print service. The operator identifier may include a network access identifier, a roaming consortium identifier, or an operator name. The AP 104 may direct the service-query message to the appropriate discovery proxy for the identified operator and obtain the discovery information therefrom.

In some implementations which include the access network query protocol, pre-association service discovery may be performed by issuing the query and receiving the response using application level packets. In this case, the AP 104 may direct the queries raised by a non-associated device to appropriate application server. The UE 106 may discover the presence and identity of the application server before issuing the query. For example, ANQP query may be used by the UE 106 to discover application server identity. As another example, the application included on the UE 106 may include an identification of the application service identity (e.g., stored in memory; configuration value). The UE 106 may transmit one or more generic advertisement service (GAS) messages that carry application pay-load as well as the identity of the application server to which the AP 104 may send the payload.

Figure 5:
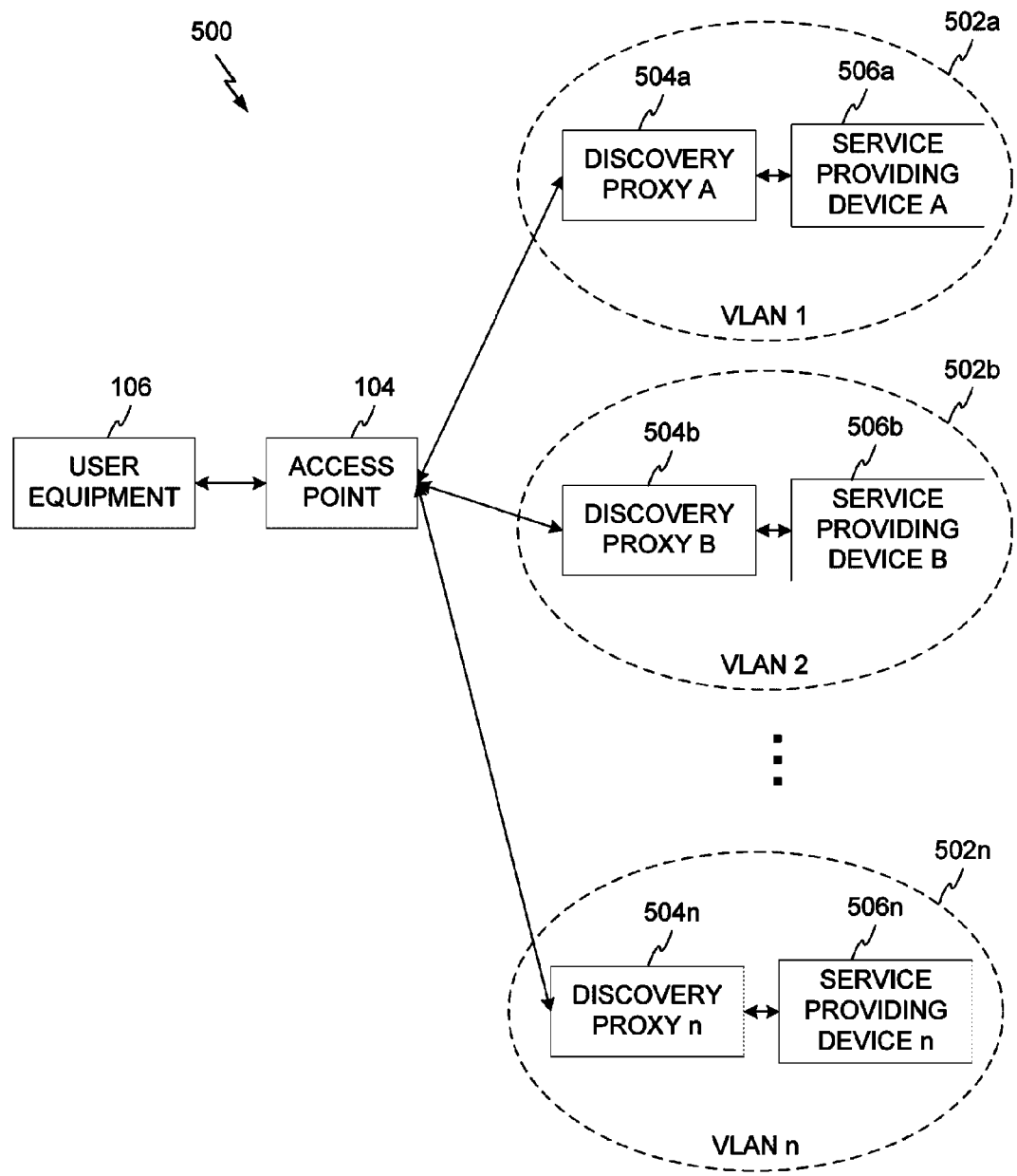
FIG. 5 illustrates a functional block diagram for a network which includes selection of a service discovery proxy for multiple sub-networks.

FIG. 5 illustrates a functional block diagram for a network which includes selection of a service discovery proxy for multiple sub-networks. As discussed above, such as with reference to FIG. 1B, the access point 104 may provide radio access to a variety of sub-networks. In the system 500, the access point 104 is shown in communication with three virtual local area networks (VLANs), VLAN 1 502a VLAN 2 502b and VLAN n 502n. With reference to FIG. 5, the use of "n" indicates the number of VLANs the access point 104 is associated with. The VLANs may be configured to communicate with the access point 104 via wired or wireless communication means. Not all VLANs may communication via the same means with the access point 104 (e.g., one VLAN is wirelessly connected to the access point while another VLAN is connected via a wired interface).

Each VLAN may be operated by a different network provider. As such, each VLAN may offer different services (e.g., via service providing device A 506a, service providing device B 506b, and service providing device 506n) to its subscribers. To allow each VLAN the ability to provide access to services hosted by the VLAN, a discovery proxy may be included for each VLAN (e.g., discovery proxy A 502a, discovery proxy B 502b, and discovery proxy n 502n). Each discovery proxy may be configured to determine what information to publish about the services provided. For example, as discussed above, the discovery proxy may include publication rules identifying information which may be released to non-authenticated devices. In this way, each VLAN operator may securely control access to the services provided.

To facilitate discovery of the services, the user equipment 106 may include, in addition to the service of interest, a provider of interest with a discovery request message. One example discovery request message discussed above is an ANQP service-query message. The access point 104 may identify the appropriate discovery proxy to route the service request based at least in part on the provider information included in the discovery request. If the requested provider is not associated with the access point 104, a message indicating the requested service for the requested provider is not available. If the requested provider is associated with the access point, the access point 104 may be configured to forward the service request to the discovery proxy associated with the specified provider.

Notwithstanding the above examples, advertising messages may be sent using a number of different types of messaging protocols. As discussed, zeroconf type protocol, Universal Plug and Play (UPnP), or ANQP may be used to offer listings of services for an AP. URIs may also be used to offer listings of services for the AP. In some aspects, modified versions of one or more of these protocols, or other protocols, may also be used to transmit advertising messages. Advertising messages may be sent as a number of different types of frames or messages. For example, advertising messages may be broadcast ANQP messages. For example, service discovery messages that are sent in response to an ANQP query may be sent in broadcast during an advertising window. Advertising messages may also be transmitted as an unencrypted broadcast data frame and/or a broadcast public action frame.

Figure 6:
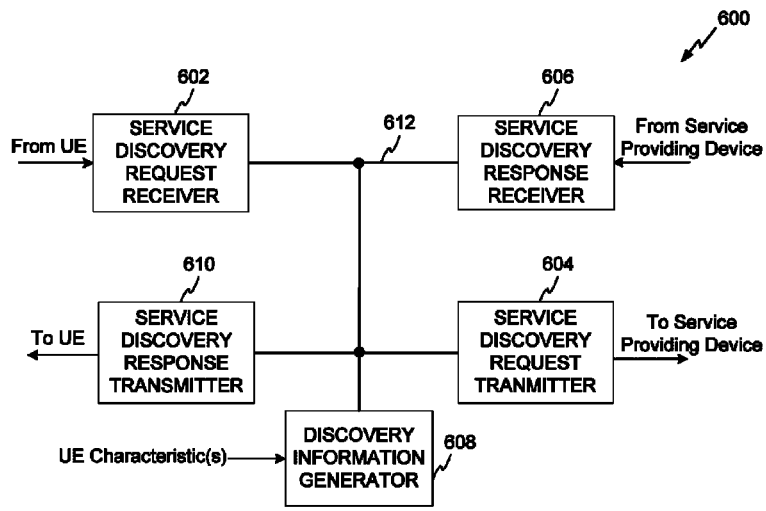
FIG. 6 illustrates a functional block diagram for an example of a device for providing service information.

FIG. 6 illustrates a functional block diagram for an example of a device 600 for providing service information. The device 600 shown is a simplified illustration including several components which help illustrate the features described herein. It will be understood that the device 600 may include other elements and/or configure the elements shown in alternative or additional ways to achieve other functions.

The device 600 includes a service discovery request receiver 602. The discovery receiver 602 is configured to receive a service information query from a user equipment for a service. The service discovery request receiver 602 may be implemented using one or more of a receiver, a transceiver, an antenna, a processor, a signal processor, a memory, a packet network interface, and an amplifier. Means for receiving a service information query may include the service discovery request receiver 602.

The device 600 includes a service discovery request transmitter 604. The service discovery request transmitter 604 is configured to transmit a service discovery request for the service. The service discovery request transmitter 604 may be implemented using one or more of a transmitter, an antenna, a power source, a signal generator, a processor and a memory. In some implementations, means for transmitting a service discovery request include the service discovery request transmitter 604.

The device 600 includes a service discovery response receiver 606. The service discovery response receiver 606 is configured to receive a service discovery response from the service including a publication rules for the information included in the service response. The service discovery response receiver 606 may be implemented using one or more of a receiver, an antenna, an amplifier, a comparator, a signal processor, a memory, and a processor. In some implementations the service discovery response receiver 606 and the service discovery request transmitter 604 may share one or more elements. In some implementations the service discovery response receiver 606 and the service discovery request transmitter 604 may be combined to form a service discovery transceiver. Means for receiving a service discovery response may include the service discovery response receiver 606.

The device 600 includes a discovery information generator 608. The discovery information generator 608 is configured to generate the service information based at least in part on the service discovery response and a characteristic of the user equipment such as authentication status. The discovery information generator 608 may include one or more of a processor, a memory, a comparator, a cache, a clock, a network interface, a message generator, and a message parser. In some implementations, means for generating the service information includes the discovery information generator 608.

The device 600 includes a discovery transmitter 610. The discovery transmitter 610 is configured to transmit a service information response including the service information. In some implementations, the service information response is transmitted directly to the user equipment. In some implementations, the service information response is transmitted to the user equipment via one or more intermediaries (e.g., an access point). The discovery transmitter 610 may be implemented using one or more of a transmitter, an antenna, a power source, a signal generator, a processor, a packet network interface, and a memory. Means for transmitting a service information response may include the discovery transmitter 610.

The elements of the device 600 may exchange information via a bus 612. In some implementations, the bus 612 may also be used to exchange power.

Figure 7:
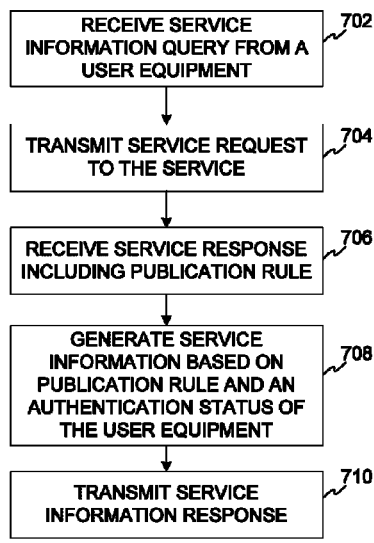
FIG. 7 shows a process flow diagram for an example method of providing service information.

FIG. 7 shows a process flow diagram for an example method of providing service information. The method shown in FIG. 7 may be implemented in one or more of the devices shown and described above such as that in FIGS. 2 and 6. At node 702, a service information query from a user equipment for a service is received. At node 704, a service discovery request is transmitted to the service. At node 706, a service discovery response is received from the service. The service discovery response includes a publication rule for information included in the service response. At node 708, the service information is generated based at least in part on the service discovery response and an authentication status of the user equipment. At node 710, a service information response including the service information is transmitted.

Figure 8:
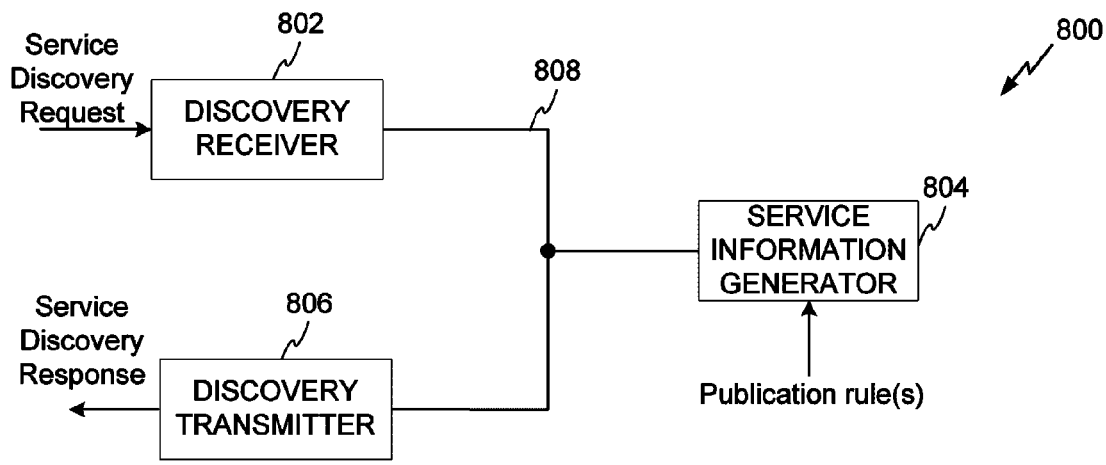
FIG. 8 illustrates a functional block diagram for an example of a device for providing access to a networked service.

FIG. 8 illustrates a functional block diagram for an example of a device for providing access to a networked service. The device 800 shown is a simplified illustration including several components which help illustrate the features described herein. It will be understood that the device 800 may include other elements and/or configure the elements shown in alternative or additional ways to achieve other functions.

The device 800 includes a discovery receiver 802. The discovery receiver 802 is configured to receive a service discovery request for the networked service. The discovery receiver 802 may be implemented using one or more of a receiver, a transceiver, an antenna, a processor, a signal processor, a memory, a packet network interface, and an amplifier. Means for receiving a service request may include the discovery receiver 802.

The device 800 includes an information processor 804. The information processor 804 is configured to generate service information describing the networked service, the service information including a publication rule for the service information. The publication rule identifies an authentication status of a requesting user equipment and service information to transmit to a requesting user equipment having the authentication status. In some implementations, the publication rule may include multiple authentication statues, each associated with service information to transmit to corresponding devices having the indicated authentication status. In some implementations, the information processor 804 may be implemented using one or more of a processor, a memory, a comparator, a cache, a clock, a network interface, a message generator, and a message parser. Means for generating service information may, in some implementations, include the information processor 804.

The device 800 includes a discovery transmitter 806. The discovery transmitter 806 is configured to transmit a service discovery response including the service information. The discovery transmitter 806 may include one or more of a transmitter, an antenna, a power source, a signal generator, a processor, a packet network interface, and a memory. In some implementations, the discovery transmitter 806 and the discovery receiver 802 may share one or more elements. In some implementations the discovery receiver 802 and the discovery transmitter 806 may be combined to form a service transceiver. Means for transmitting a service discovery response may include the discovery transmitter 806.

The elements of the device 800 may exchange information via a bus 808. In some implementations, the bus 808 may also be used to exchange power.

Figure 9:
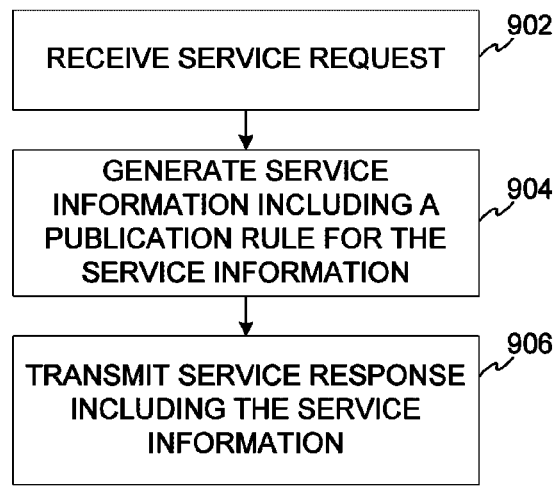
FIG. 9 illustrates a process flow diagram for an example method of providing access to a networked service.

FIG. 9 illustrates a process flow diagram for an example method of providing access to a networked service. The method shown in FIG. 9 may be implemented in one or more of the devices shown and described above such as that in FIGS. 2 and 8. At node 902, a service discovery request for the networked service is received. At node 904, service information describing the network service is generated, the service information including a publication rule identifying an authentication status and service information to transmit to a requesting user equipment having the authentication status. At node 906, a service discovery response including the service information is transmitted.

Examples of systems, methods, apparatuses, and devices for efficient infrastructure service discovery with security have been described. In one aspect, the example systems and methods describe how to advertise services available via an access point without requiring a device to connect to the access point for discovery. This may allow devices to determine, prior to establishing a connection with an access point, whether a desired service is offered. In another aspect, a description of publication rules is provided. As discussed, service providers can use the publication rules to identify service information which may be discovered by devices based on device characteristics or other factors to allow controlled, secure discovery of the service information.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for providing service information, the apparatus comprising:
    a receiver configured to receive a service information query from a user equipment for a service prior to receiving an association request from the user equipment;
    a transmitter; and
    a service information processor configured to:
        transmit, via the transmitter, a service discovery request to one or more service devices providing the service;
        receive, via the receiver in response to the service discovery request, a service discovery response from a service device included in the one or more service devices providing the service, the service discovery response including a publication rule having:
            a first portion identifying an authentication status,
            a second portion identifying service description information to transmit to a requesting user equipment having the authentication status; and
            a third portion that identifies a time during which the publication rule applies;
        determine that a user equipment authentication status for the user equipment corresponds to the authentication status identified in the first portion of the publication rule;
        determine that a current time is during the time which the publication rule applies; and
        generate a service information response including at least a portion of the service description information
    wherein the transmitter is further configured to transmit the service information response to the user equipment, wherein the service information response is transmitted prior to authenticating the user equipment.

2. The apparatus of claim 1, wherein the service information query further includes an operator identifier, wherein the operator identifier includes one or more of a network access identifier, a roaming consortium identifier, or an operator name.

3. The apparatus of claim 1, wherein the publication rule further includes a third portion that identifies one or more characteristics of the requesting user equipment which may receive the service description information, wherein the one or more characteristics of the requesting user equipment includes capability, bandwidth, location, accessory, or radio access technology.

4. The apparatus of claim 1, wherein the publication rule further includes a third portion including a value indicating if the publication rule may be cached and, if so, a duration of time the publication rule may be cached for.

5. The apparatus of claim 1, wherein the service information processor is further configured to identify the service from a plurality of services.

6. The apparatus of claim 5, wherein the plurality of services are provided by a plurality of service providers.

7. The apparatus of claim 1, wherein generating the service information comprises generating service information indicating no service found upon determining the authentication status of the user equipment is not included in the publication rule.

8. A method of providing service information, the method comprising:
    receiving a service information query from a user equipment for a service prior to receiving an association request from the user equipment;
    transmitting a service discovery request to one or more service devices providing the service;
    receiving, in response to the service discovery request, a service discovery response from a service device included in the one or more service devices providing the service, the service discovery response including a publication rule having:
        a first portion identifying an authentication status,
        a second portion identifying service description information to transmit to a requesting user equipment having the authentication status; and
        a third portion that identifies a time during which the publication rule applies;
    determining that a user equipment authentication status for the user equipment corresponds to the authentication status identified in the first portion of the publication rule;
    determining that a current time is during the time which the publication rule applies;
    generating a service information response including at least a portion of the service information; and
    transmitting the service information response to the user equipment, wherein the service information response is transmitted prior to authenticating the user equipment.

9. The method of claim 8, wherein the service information query further includes an operator identifier, wherein the operator identifier includes one or more of a network access identifier, a roaming consortium identifier, and an operator name.

10. The method of claim 8, wherein the publication rule further includes a third portion that identifies one or more characteristics of the requesting user equipment which may receive the service description information, wherein the one or more characteristics of the requesting user equipment includes capability, bandwidth, location, accessory, and radio access technology.

11. The method of claim 8, wherein the publication rule further includes a third portion including a value indicating if the publication rule may be cached and, if so, a duration of time the publication rule may be cached for.

12. The method of claim 8, wherein the service information processor is further configured to identify the service from a plurality of services provided by a plurality of service providers.

13. An apparatus for providing access to a networked service, the apparatus comprising:
    a receiver configured to receive a service discovery request for the networked service from an access point providing service information to a user equipment;
    a service information processor configured to
        generate service information describing the networked service, the service information including a publication rule having:
            a first portion identifying an authentication status, a second portion identifying service description information to transmit to a requesting user equipment having the authentication status; and a third portion that identifies a time during which the publication rule applies; and determine that a current time is during the time which the publication rule applies;

a transmitter configured to transmit, in response to the service discovery request, a service discovery response including the service information to the access point providing the service information to the user equipment, wherein the service response is transmitted prior to the access point receiving an association request from the user equipment; and a processor configured to provide the networked service to the user equipment via the access point.

14. The apparatus of claim 13, wherein service discovery request originated with a user equipment.

15. The apparatus of claim 13, wherein the publication rule further includes a third portion that identifies one or more characteristics of the requesting user equipment which may receive the information, the one or more characteristics of requesting user equipment including capability, bandwidth, location, accessory, or radio access technology of the requesting user equipment.

16. The apparatus of claim 13, wherein the publication rule further includes a third portion including a value indicating if the publication rule may be cached and, if so, a duration of time the publication rule may be cached for.

17. The apparatus of claim 13, wherein the service information processor is further configured to identify the service from a plurality of services.

18. The apparatus of claim 13, further comprising an access proxy, the access proxy configured to obtain at least a portion of the service information from a service source, and wherein the service information processor is further configured to generate the service information based at least in part on obtained portion of the service information.

19. A method of providing access to a networked service, the method comprising:

receiving, from an access point providing service information to a user equipment, a service discovery request for the networked service;

generating service information describing the networked service, the service information including a publication rule having:

a first portion identifying an authentication status, and a second portion identifying service description information to transmit to a requesting user equipment having the authentication status; and a third portion that identifies a time during which the publication rule applies;

determining that a current time is during the time which the publication rule applies;

transmitting, to the access point providing the service information to the user equipment in response to the service discovery request, a service discovery response including the service information, wherein the service response is transmitted prior to the access point receiving an association request from the user equipment; and providing the networked service to the user equipment via the access point.

20. The method of claim 19, wherein service discovery request originated with a user equipment.

21. The method of claim 19, wherein the publication rule further includes a third portion that identifies one or more characteristics of the requesting user equipment which may receive the information, the one or more characteristics of requesting user equipment including capability, bandwidth, location, accessory, or radio access technology of the requesting user equipment.

22. The method of claim 19, wherein the publication rule further includes a third portion including a value indicating if the publication rule may be cached and, if so, a duration of time the publication rule may be cached for.

23. The method of claim 19, wherein the service information processor is further configured to identify the service from a plurality of services.

24. The method of claim 19, further comprising obtaining at least a portion of the service information from a service source, and wherein said generating of the service information based at least in part on the obtained portion of the service information.

* * * * *